Aug. 25, 1925.
H. RIESELER
1,551,055
HYDRAULIC CHANGE SPEED AND REVERSING GEAR
Filed Oct. 18, 1922    3 Sheets-Sheet 2
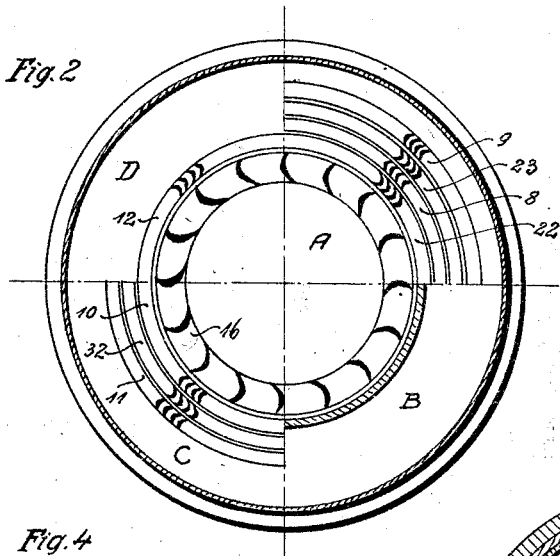
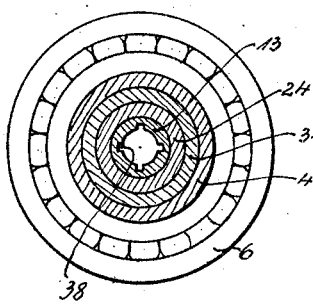
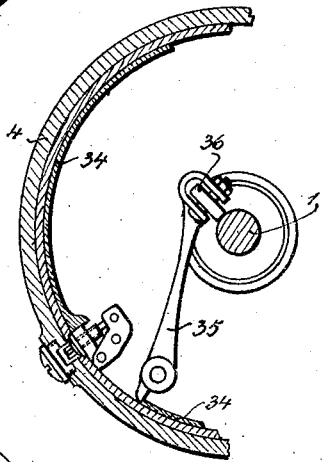
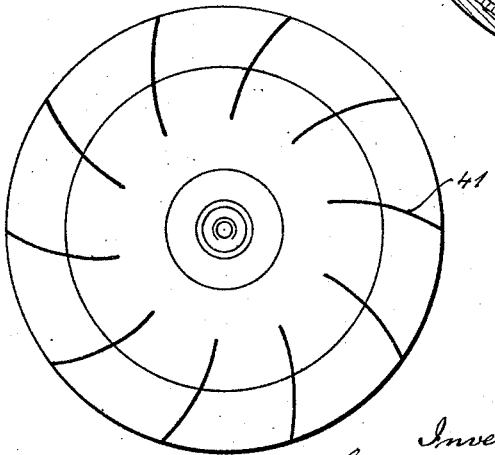
Inventor
Hermann Rieseler
by Henry Orth
Atty Aug. 25, 1925.　　　　　　　　　　　　　　　　　　　1,551,055
H. RIESELER
HYDRAULIC CHANGE SPEED AND REVERSING GEAR
Filed Oct. 18, 1922　　　3 Sheets-Sheet 3
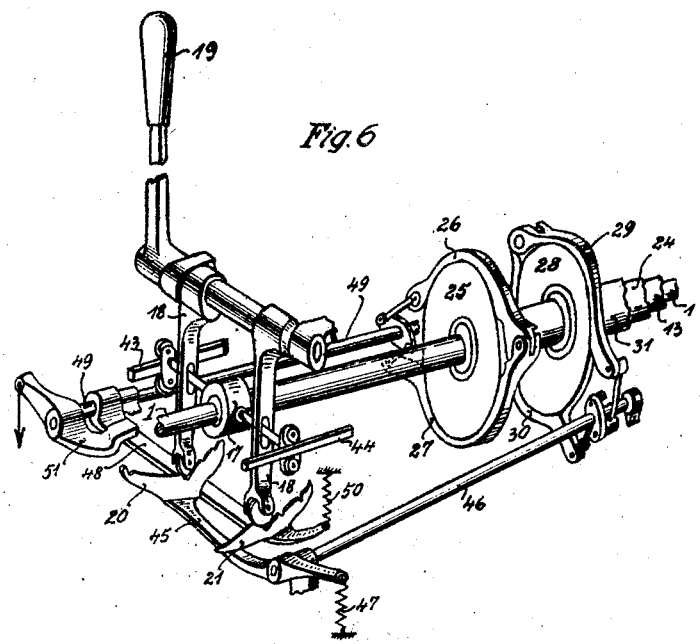

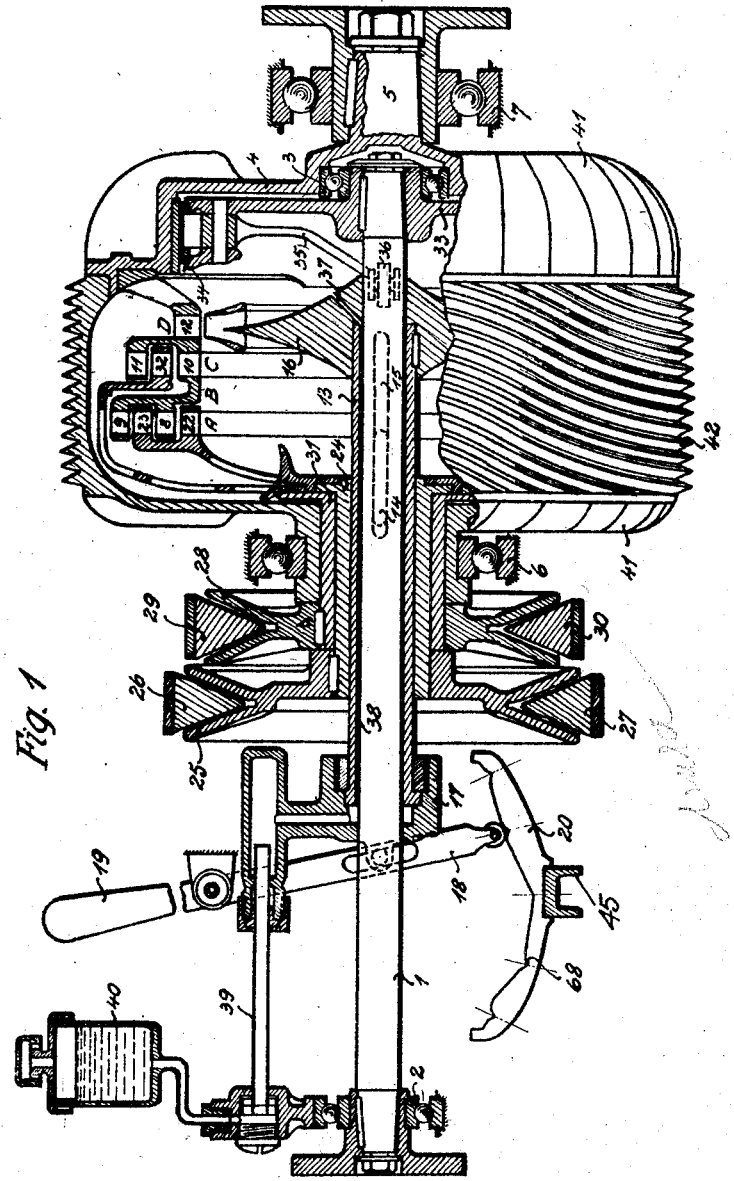

Patented Aug. 25, 1925.

1,551,055

UNITED STATES PATENT OFFICE.

HERMANN RIESELER, OF HAMBURG, GERMANY.

HYDRAULIC CHANGE-SPEED AND REVERSING GEAR.

Application filed October 18, 1922. Serial No. 595,291.

*To all whom it may concern:*

Be it known that I, HERMANN RIESELER, a citizen of the German Republic, and a resident of Andreasstr. 31, Hamburg, Germany, have invented certain new and useful Improvements in Hydraulic Change-Speed and Reversing Gears; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to an improved hydraulic change-speed and reversing gear by means of which the rotation of a driving member may be imparted to a driven member through the medium of a suitable liquid, the speed of rotation be changed and the direction of rotation of the driven member be reversed.

For transmitting the output of a power engine by means of a centrifugal pump driven by the said power engine, to turbine wheels of a coaxial driven shaft in variable adjustable rates of transmission for going forward and for reversing the direction of rotation of the driven shaft, attempts have already been made to obtain the desired adjustments of the power transmission by throttling the outlet openings of the driving centrifugal pump, or by a simultaneous partial admission of ahead and reversing blade rims, or also by the action of a mechanical braking force. Devices have also become known in which a blade rim having fixed blades operates at one time as a driven rim for going forwards and another time as a fixed rim for reversing.

With all these known devices the change of velocity takes place for the greatest part at the expense of the output or power admitted into the gear.

Before entering into a detailed description of the separate elements which make up my hydraulic or liquid gear I shall give a general explanation of its novel features.

The drawbacks existing in the known liquid gears are avoided in the liquid change and reversing gear of the present invention, in which the driving centrifugal pump and the driven rotating casing are arranged to permit of a mutual or relative displacement or shifting, by reason of the fact that the rotating casing is provided beside the reversing blade rim with relatively staged ahead blade rims, and that in displacing or shifting the driving centrifugal pump beyond the highest transmission stage of the liquid gear the driving shaft is positively coupled with the driven casing.

The driving liquid rotating with the casing, is set in motion by the driving centrifugal pump which is provided with a double inlet for compensating or balancing the dynamic axial movement, in such a manner that a double cycle is formed, the stream lines of which meet or unite only in the power transmitting blade rims. The stream lines having left the actually driven group of blade rims, spread to both sides in axial direction and flow back with greatly reduced return velocity and correspondingly diminished losses of flow into the driving centrifugal pump in which they unite anew.

In order to obtain practically serviceable efficiencies the wheels serving for starting the gear are double- or multistaged. Between the blade rims of these driven turbines with double- or multistage action (secondary turbines) are arranged or inserted fixed guide blade rims which may be disengaged and brought out of action by loosening their fastening means.

During the normal working the guide blade rims are thrown in gear only during the period of admission to the respective secondary turbines. When the admission ceases the guide blade rims are automatically disengaged for avoiding objectionable braking actions. But when such a braking action is temporarily wanted during the working of an ahead turbine, it is sufficient to throw in gear the guide rims of the astern turbine to ensure a shockless braking of the gear.

The axial displacement or shifting of the driving centrifugal pump fastened on a slidable hollow shaft, from one driven blade rim to another driven blade rim and the direct coupling of the driving shaft with the driven casing are effected by axially displacing the said hollow shaft on the driving shaft. When there is provided an axially displaceable driving centrifugal pump, the hollow shaft firmly connected therewith is loosely or rotatably journalled in a head suitably guided against rotation and adapted to be moved axially to and fro by a hand actuated speed changing and reversing lever according to the desired or required connection or transmission stage. The full admission of one or the other driven blade rim is ensured by the arrangement of notches at the actuating lever or at another part of this lever mechanism.

In axially displacing or shifting the driving centrifugal pump beyond the highest turbine transmission stage the diameter of a brake strap is varied by means of a lever, whereby the direct or positive power transmission is effected without losses in the fluid gear.

The small losses in the turbine transmission stages which can not be avoided during the working of the gear, result, in a heating of the driving fluid medium and in a corresponding expansion of the same. In order to avoid the therefrom resulting formation of an excesive pressure in the interior of the rotating turbine casing, the driving fluid is in communication by means of channels and a pipe conduit with a stationary compensating vessel which is under atmospheric pressure and adapted to make up automatically any losses of fluid. In order to keep the heating of the driving fluid within admissible bounds, the surface of the rotating turbine casing is furnished with blade- or screw-shaped cooling ribs adapted to act as a fan. In cases in which the heat engendered by losses of the gear shall not be abstracted by ventilation, but shall be utilized for other purposes, the cooling ribs on the rotating turbine casing are dispensed with and the driving fluid is passed during the operation from the rotating casing into a stationary body adapted for the emission and utilization of the heat engendered by losses of the gear. From this body the driving fluid is passed back into the interior of the rotating casing.

By arranging at the end faces of the rotating casing suitable axial chambers for the reception of a part of the driving fluid it is possible to maintain when the gear is at rest, the fluid level below the shaft bearing built into the casing.

My hydraulic change speed and reversing gear is made up of a number of parts whose cooperation determines its successful action and efficient use, and in which the invention consists in the construction, combination and arrangement of the several parts of the gear, as will be hereinafter more fully described, and particularly pointed out in the claims which are appended hereto and form a part of this application.

In describing my invention in detail, reference will be had to the accompanying drawings wherein like characters designate like parts throughout the several views, and in which:

Fig. 1 is a longitudinal section of the improved hydraulic or liquid-gear.

Fig. 2 is a composite cross section of the same; the quadrant A showing a section through the group of blade rims for going backwards, the quadrant B a section through the neutral or no-load position of the primary turbine, the quadrant C a section through the first (double-staged) transmission stage of the ahead turbine, and the quadrant D a section through a further (single-staged) transmision stage of the ahead turbine.

Fig. 3 is a detailed sectional view illustrating the means for coupling the driving shaft with the driven rotating turbine casing.

Fig. 4 shows a cross section of the fore or front bearing of the rotating turbine casing.

Fig. 5 is an elevation of the back cover of the rotating turbine casing as it appears when seen from the rear or right hand side of the drawing.

Fig. 6 is a perspective view on a smaller scale illustrating, as an example, an embodiment of the speed changing and reversing lever mechanism with the device for throwing in and out of gear the guide blade rims.

Fig. 7 is a sectional view showing, as an example, a device for the emission and utilization of heat engendered by losses of the fluid gear.

In Fig. 1 the driving shaft 1 is connected to the driving power engine and placed on ball bearings 2 and 3. The ball bearing 3 of the driving shaft is mounted in the rear part of the driven rotating casing 4 which is placed on ball bearings 6 and 7 and firmly connected to the driven shaft 5. To the rotating casing 4 are furthermore firmly connected the reversing blade rims 8 and 9 the rims 10 and 11 (first stage for going forwards) and 12 (second stage for going forwards). The number of the turbine transmission stages may of course be increased in the manner shown, if desired or required.

On the driving shaft is mounted a hollow shaft 13 movable in axial direction but secured against rotation by a groove and feather connection 14, 15 so that any rotation of the shaft 1 is imparted to the hollow shaft 13. On the latter is firmly mounted the driving centrifugal pump or primary turbine 16. The fore or front end of the hollow shaft 13 is journalled in a shifting head 17 having a straight line motion, and being adapted to be moved to and fro in axial direction by slotted arms 18 (Fig. 6) of a rocking shaft actuated by an operating lever 19. The lower end of each arm 18 is provided with a roller running each on a curved rail 20 or 21 respectively which are furnished with a number of notches 68 (Fig. 1) for the said rollers. The said rails are supported by horizontal lever arms 45 and 48 respectively, each under the influence of a tension spring 47 and 50 respectively (Figs. 1 and 6) which springs tend to swing the said lever arms in an upward direction in order to keep the notched rails in close contact with the rollers of the arms 18. The number of the notches corresponds to the number of the transmission stages or grades (in the example shown there are five grades viz one for going backwards, one for the neutral or no-load position, two for going forwards, (first and second speed step, and one for directly or positively going forwards). These notches serve on the one hand for controlling the throwing in and out of gear of the guide blade rims and on the other hand for fixing the hollow shaft in any axial position in such a manner that the primary turbine in the several working positions is always right opposite to or registering with the driven blade rims. The primary turbine shall not take unfavorable intermediate positions except when passing from one to another transmission step or stage.

The guide rims 22, 23 of the blade rim group A (for reversing) are in rigid connection with the arresting or locking disc 25 by means of a hollow shaft 24. This arresting disc may be locked by the brake blocks 26 and 27. The arresting disc 28 is in rigid connection with the guide rim 32 for the second stage of the first ahead turbine (blade rim group C) by means of the hollow shaft 31.

Within the rear part of the rotating casing 4 is fastened on the driving shaft 1 a coupling disc 33, which is provided with a brake strap 34 (see also Fig. 3). Within the coupling disc 33 is fulcrumed a double armed lever 35 the inner end of which carries a roller 36. On displacing or shifting the primary turbine 16 to the right hand side of Figure 1 the roller 36 runs onto the boss of the primary turbine whereby the inner arm of the said double armed lever is forced outwards, (Fig. 3). The outer arm of the said double armed lever is thereby compelled to press the brake strap 34 against the inner wall of the rotating casing 4 which is coupled in this manner directly with the driving shaft 1.

The interior of the rotating casing 4 fully filled up with a suitable driving liquid, is in communication by means of a bore 37 in the primary turbine and by longitudinal grooves 38 at the inside wall of the hollow shaft 13, (see also Fig. 4) and by a telescopic pipe 39 with a vessel 40 adapted to compensate any variation of the volume of the driving fluid.

In the example shown by Figure 1 the rotating casing 4 is provided on its end faces with ventilating vanes 41 and on its circumferential surface with helically curved cooling ribs 42, the said vanes and ribs serving for abstracting the heat engendered by losses of the gear especially when the casing 4 and shaft 1 are not directly connected.

The connection or relation existing between the axial shifting of the hollow shaft 13 carrying the driving centrifugal pump 16 and the throwing in and out of gear of the guide blade rims will be more easily understood from Figure 6. The head 17 of the hollow shaft 13 is guided in a straight line by the rails 43 and 44 which prevent the head from being turned about its axis. The double armed locking lever 45 supporting the curved rail 20 is keyed on the locking shaft 46 serving for tightening or slackening the brake blocks 29 and 30 of the locking disc 28. The tension spring 47 effects the locking of the guide rim 32 (Fig. 1) as soon as the respective notch of the curved rail 20 admits the upward rocking of the latter. This is the case when the primary turbine 16 is opposite to or registering with the blade rim group C (first turbine stage for going forwards).

The curved rail 21 is supported by the locking lever 48 loosely mounted on the locking shaft 49. If the primary turbine has been brought into the position to be opposite to or to register with the blade rim group A (stage for reversing), a certain notch of the curved rail 21 permits an upward rocking of the locking lever 48 by means of the tension spring 50. In this upward rocking movement the lever 48 strikes against a lateral lug of a double armed stop lever 51 keyed on the locking shaft 49 which by its being rocked turns the said shaft in order to tighten the brake blocks 26, 27 of the locking disc 25, whereby the hollow shaft 24 and the guide blade rims 22, 23 rigidly connected therewith are arrested. The releasing of the guide rims takes place automatically with the cessation of the admission to the respective blade rim group owing to the engagement of the related curved rail by the roller of the related arm 18, and to the downward rocking of the related locking lever when lever 19 is shifted.

The guide blade rims 22, 23 (Fig. 1) may be arrested for obtaining a desired braking of the gear also during the operation of an ahead turbine wheel or wheels, or during operation when the driving and driven member are directly or positively coupled, by rocking the catch lever 51 in the direction of the arrow shown in Fig. 6. In this case the guide or reversing rim 22 arrested or locked in the driving liquid which partakes in the rotation, acts as a pumping rim, that effects in a braking sense an admission to the secondary blade rims 8 and 9 running forwards.

The arrangement represented in Figure 7 in longitudinal section shows the abstraction or transmission of the heat engendered by losses of the gear to a cooling or heat exchange device outside the rotating casing 4 when the shaft 1 and casing 4 are not directly connected. Owing to the centrifugal action of the rotating driving liquid there is in the interior of the casing 4 a pressure, which is nearly equal to zero in the immediate neighbourhood of the axis of rotation and increases in radial direction according to the increasing distance therefrom. This difference of pressure is used to pass the driving fluid through the stationary cooling device outside the rotating casing and then from here again back into the interior of the said casing. For this purpose the arms or spokes 52 and 53 of the guide rims are provided with buckets or scoops 54 and 55 respectively which are in communication with the channel 58 of the hollow shaft 24 by means of discharging pipes 56 and 57 respectively. The channel 58 discharges into the annular groove 59 of a fixed sleeve 60 connected to the heat exchanging device 62 by a pipe conduit 61. The inlet and outlet of the heat absorbing medium are designated by the numerals 63 and 64 respectively. The return pipe conduit 65 leads back to the annular groove 66 of the sleeve 60. From here the driving fluid passes back into the interior of the rotating casing 4 through the bore 67 of the hollow shaft 24. On arresting for example the locking disc 25 the centrifugal action in the bore 57 ceases and the driving fluid enters into the same through the scoop-like inlet opening 55. If for example the locking disc 25 is running and the locking disc 28 is arrested, the driving fluid enters into the bore 56 through the inlet opening 54, passes through the passages 58, 59, 61 and returns to the casing 4 through the passages 65, 66, 67 after the delivery of its heat in the heat exchanging device 62.

I claim:

1. In a hydraulic change-speed and reversing mechanism having a rotatable casing loosely mounted on a driving shaft and a centrifugal pump connected to but shiftable longitudinally of said shaft in the casing; the improvement which comprises a plurality of turbines for driving said casing at different speeds one of which is arranged for reverse driving, and means operated by said pump when axially displaced beyond the turbine for the highest speed to positively connect the casing and shaft.

2. In a hydraulic change-speed mechanism having a rotatable casing loosely mounted on a driving shaft and a centrifugal pump connected to said shaft; the improvement which comprises a plurality of turbines in said casing for driving the same, each turbine having a different number of stages, and means to cause relative axial displacement of the pump and turbines to obtain different speeds of the casing.

3. In a hydraulic change speed mechanism, a shaft, a casing loose on the shaft and a pump slidable thereon in the casing, and multi-stage turbines in the casing for driving it and having turbine guide rims with any one of which the pump may co-operate.

4. In a hydraulic change-speed mechanism, a driving shaft, a driven casing loose thereon, a plurality of turbines in the casing and connected thereto each having a different number of stages for different speeds, a pump on said driving shaft and means to relatively displace the pump and casing to cause said pump to deliver unthrottled to any one of said turbines.

5. In a hydraulic change-speed mechanism, a driving shaft, a casing loose thereon, a plurality of multi-stage turbines in said casing for driving it each comprising turbine rims and guide rims, the guide rims of each turbine being rotatable and independent of the rims of the other turbines, a pump on said driving shaft, means to relatively displace said pump and turbine, and means dependent on said displacing means to arrest the rotation of said guide rims.

6. In a hydraulic change-speed and reversing mechanism, a driving shaft, a centrifugal pump rotated thereby, a casing on said shaft, means to cause relative axial displacement of the casing and pump, a releasable connecting means between said casing and shaft, a plurality of turbines in the casing for driving it and arranged to be driven by said pump at different speeds, one of which is a reversing turbine, and means actuated by said pump when said relative displacement causes the pump to run idle to operate said connecting means.

7. In a hydraulic change speed mechanism, a shaft, a casing rotatable on said shaft, a reversing turbine rim in the casing and connected thereto and a reversing guide blade rim loose on said shaft and co-operating with said turbine rim, a pump, a plurality of forward driving turbine rims for different speeds, a guide blade rim co-operating with one of said forward driving turbine rims, means to shift said pump into operative relation to any one of said turbine rims, and brake means to hold and release the reversing turbine guide rim when said pump is operating in conjunction with any one of the turbine rims.

8. In a hydraulic change speed mechanism, a shaft, a casing loose on the shaft, turbines in said casing for driving said casing and comprising turbine blade rims and guide blade rims, a pump slidable on the shaft into cooperation with any one of said turbines, a heat exchanger connected to said casing and receiving heated motive fluid from near the periphery of the casing at the guide blade rims and returning the cooled fluid to the casing near its centre.

9. In a hydraulic change speed mechanism, a shaft, a casing rotatable thereon, a turbine therein for driving the casing and having turbine blades and guide blades, means to rotatably support the guide blades from said shaft, a pump on the shaft to supply motive fluid to the turbine, a heat exchanger, a brake for said guide blades, said means having a passage leading from near the periphery of said casing to the heat exchanger, and means to conduct cooled motive fluid from the exchanger to the casing near its axis.

10. In a change speed and reversing mechanism, a shaft, a casing loose thereon, a pair of turbines in the casing for driving it and having rotatable guide rims, a pump on the shaft shiftable to co-operate with either turbine, a brake for each guide rim, a pump shifting lever, means to simultaneously operate the brake of the guide rim of the turbine with which the pump co-operates, and means to apply the brake to one of said guide rims at either shifted position of the pump.

11. In a hydraulic change-speed mechanism, a driving shaft, a casing loose thereon, a driving pump slidable but not rotatable on said shaft and in the casing, a reversing turbine in said casing for driving it, and a plurality of forward driving turbines for different forward speeds, some of said turbines being multi-stage turbines having guide rims for increasing the turning moments of the turbines in accordance with the speed to be developed.

12. In a hydraulic speed changing mechanism, a driving shaft, a casing loose thereon, a centrifugal pump on said shaft and means to relatively and axially displace said pump and casing, in combination with a plurality of multistage turbines in the casing for driving it, each turbine having at least one guide rim capable of rotation about said shaft, separate means to hold each guide rim against rotation and brought into operation in accordance with the operative positions of said pump.

13. In a hydraulic speed changing mechanism, a shaft, a casing rotatable thereon, a centrifugal pump in said casing driven by said shaft, means to relatively and axially displace said pump and casing, turbines in said casing for driving the same having guide blade rims, means to rotatably mount said rims, brake means for the rims and a heat-exchanger connected to the casing, said rotatable rim mounting means having passages to conduct driving liquid from near the periphery of said casing to said heat-exchanger.

14. In a change speed and reversing mechanism, a shaft, a casing loose thereon, turbines in the casing for driving the same and having rotatable guide rims, a pump on the shaft shiftable to co-operate with any turbine, a brake for each guide rim, a pump shifting lever, means to simultaneously operate the brake of the guide rim of that turbine with which the pump co-operates to hold the rim thereof, and means to simultaneously release the brake for the guide rims that are inactive for the time being.

15. In a hydraulic speed changing mechanism, a driving shaft, a casing rotatable thereon, a pump slidable but not rotatable on said shaft, a plurality of turbines in said casing for driving the same and whose stages increase inversely as the speed to be imparted to said casing, means to selectively position said pump in operative relation to any turbine, and means to directly connect the driving shaft and casing, said means actuated by said pump when moved into unthrottled, inoperative position.

16. In a hydraulic change-speed mechanism having a rotatable casing loosely mounted on a driving shaft and a centrifugal pump connected to but shiftable longitudinally on said shaft; the improvement which comprises a plurality of turbines for forward movement in said casing for driving it, each turbine having a different arrangement of blades and means to cause axial displacement of the pump relatively to the turbines to obtain different ratios of transmission between pump and turbines or between pump and casing.

17. In a hydraulic change-speed mechanism, a driving shaft, a casing loose thereon, a plurality of turbines in the casing for driving it, each turbine having a different ratio of transmission for different forward speeds, a pump on said driving shaft and means to relatively displace the pump and turbines to cause said pump to deliver unthrottled to any one of said turbines.

18. In a hydraulic change-speed mechanism, a driving shaft, a casing loose thereon, a driving pump slidable but not rotatable on said shaft and in the casing, a reversing turbine in said casing and a plurality of forward driving turbines for different forward speeds, said turbine arranged to drive said casing, some of said turbines having a plurality of stages with associated turbine guide rims for increasing the torque of the turbines in accordance with the speed to be developed when said pump is cooperating with one of said turbines.

19. In a hydraulic change-speed mechanism, a driving shaft, a casing loose thereon, a plurality of multistage turbines on said casing each comprising turbine rims and guide rims, the guide rims of each turbine being independently rotatable of the rims of the other turbines, a pump on said driving shaft, means to relatively displace said pump and turbine, and means dependent on said displacing means to arrest the rotation of the guide rims.

20. In a hydraulic speed changing mechanism, a driving shaft, a casing loose thereon, a centrifugal pump on said shaft and means to relatively and axially displace said pump and casing, in combination with a plurality of double or multistage turbines in the casing and connected thereto, each turbine having at least one guide rim capable of rotation about said shaft, separate means to hold each guide rim against rotation and brought into operation in accordance with the operative positions of said pump.

In testimony that I claim the foregoing as my invention, I have signed my name.

HERMANN RIESELER. [L. S.]